(12) United States Patent
Qiao et al.

(10) Patent No.: US 7,011,971 B2
(45) Date of Patent: Mar. 14, 2006

(54) METHOD OF MAKING RANDOM ARRAY OF MICROSPHERES USING ENZYME DIGESTION

(75) Inventors: Tiecheng A. Qiao, Webster, NY (US); Krishnan Chari, Fairport, NY (US); Robledo O. Gutierrez, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 600 days.

(21) Appl. No.: 10/062,326

(22) Filed: Jun. 3, 2002

(65) Prior Publication Data

US 2003/0224361 A1 Dec. 4, 2003

(51) Int. Cl.
*C12M 1/34* (2006.01)
*B01L 9/00* (2006.01)
(52) U.S. Cl. .................................. 435/287.2; 422/104
(58) Field of Classification Search ................ 435/6, 435/7.1, 174, 283.1, 287.2; 422/40, 68.1, 422/82.05, 104
See application file for complete search history.

(56) References Cited

U.S. PATENT DOCUMENTS

| | | | |
|---|---|---|---|
| 5,412,087 A | 5/1995 | McGall et al. | |
| 5,489,678 A | 2/1996 | Fodor et al. | |
| 5,981,180 A | 11/1999 | Chandler et al. | |
| 6,023,540 A | 2/2000 | Walt et al. | |
| 6,079,283 A | 6/2000 | Papen et al. | |
| 6,083,762 A | 7/2000 | Papen et al. | |
| 6,094,966 A | 8/2000 | Papen et al. | |
| 6,280,912 B1 | 8/2001 | Whitesides et al. | |
| 6,716,579 B1 * | 4/2004 | Baidya et al. | 435/6 |
| 6,770,441 B1 * | 8/2004 | Dickinson et al. | 435/6 |
| 6,846,635 B1 * | 1/2005 | Anderson et al. | 435/7.1 |

OTHER PUBLICATIONS

Chari et al., Random Array of Miscrospheres, U.S. Appl. No. 09/942,241, filed Aug. 29, 2001.
*Nature Biotech*, "Quantum-dot-tagged microbeads for multiplexed optical coding of biomolecules," 19, 631-635, (2001).
*Secundum Artem*, vol. 4, No. 5, Lloyd V. Allen.
*Journal of Colloid and Interface Science*, "Experimental and Theoretical Analysis of the Limited Doalescence Process: Stepwise Limited Coalescence," T. H. Whitesides and D. S. Ross, vol. 169, pp. 48-59, (1985).
*Science*, 251, "Light-Directed, Spatially Addressable Parallel Chemical Synthesis," Stephen P. A. Fodor et al., pp. 767-773, 1991.

* cited by examiner

*Primary Examiner*—Kenneth R. Horlick
(74) *Attorney, Agent, or Firm*—Doreen M. Wells; Kathleen Neuner Manne

(57) ABSTRACT

A method of making a microarray comprising the steps of:—providing a support;—coating on the support a fluid composition containing microspheres and gelatin;—immobilizing the microspheres in the gelatin coating;—partially digesting the gelatin with an enzyme to expose surfaces of the microspheres; and—removing the enzyme and digested gelatin from the coating.

18 Claims, 5 Drawing Sheets

METHOD OF MAKING RANDOM ARRAY OF MICROSPHERES USING ENZYME DIGESTION

FIELD OF THE INVENTION

The present invention concerns biological microarray technology in general. In particular, it concerns an array of microspheres on a gelatin substrate and a method of exposing the surface of the microspheres to analytes contained in test samples. Preferably, the microspheres bear capture agents (also called probes) on their surfaces.

BACKGROUND OF THE INVENTION

Ever since it was invented in the early 1990s (Science, 251, 767–773, 1991), high-density arrays formed by spatially addressable synthesis of bioactive probes on a 2-dimensional solid support has greatly enhanced and simplified the process of biological research and development. The key to current microarray technology is deposition of a bioactive agent at a single spot on a microchip in a "spatially addressable" manner.

Current technologies have used various approaches to fabricate microarrays. For example, U.S. Pat. Nos. 5,412,087, and 5,489,678 demonstrate the use of a photolithographic process for making peptide and DNA microarrays. The patent teaches the use of photolabile protecting groups to prepare peptide and DNA microarrays through successive cycles of deprotecting a defined spot on a 1 cm×1 cm chip by photolithography, then flooding the entire surface with an activated amino acid or DNA base. Repetition of this process allows construction of a peptide or DNA microarray with thousands of arbitrarily different peptides or oligonucleotide sequences at different spots on the array. This method is expensive. An ink jet approach is being used by others (e.g., U.S. Pat. Nos. 6,079,283; 6,083,762; and 6,094,966) to fabricate spatially addressable arrays, but this technique also suffers from high manufacturing cost in addition to the relatively large spot size of 40 to 100 $\mu$m. Because the number of bioactive probes to be placed on a single chip usually runs anywhere from 1000 to 100,000 probes, the spatial addressing method is intrinsically expensive regardless how the chip is manufactured. An alternative approach to the spatially addressable method is the concept of using fluorescent dye-incorporated polymeric beads to produce biological multiplexed arrays. U.S. Pat. No. 5,981,180 discloses a method of using color coded beads in conjunction with flow cytometry to perform multiplexed biological assay. Microspheres conjugated with DNA or monoclonal antibody probes on their surfaces were dyed internally with various ratios of two distinct fluorescence dyes. Hundreds of "spectrally addressed" microspheres were allowed to react with a biological sample and the "liquid array" was analyzed by passing a single microsphere through a flow cytometry cell to decode sample information. U.S. Pat. No. 6,023,540 discloses the use of fiber-optic bundles with pre-etched microwells at distal ends to assemble dye loaded microspheres. The surface of each spectrally addressed microsphere was attached with a unique bioactive agent and thousands of microspheres carrying different bioactive probes combined to form "beads array" on pre-etched microwells of fiber optical bundles. More recently, a novel optically encoded microsphere approach was accomplished by using different sized zinc sulfide-capped cadmium selenide nanocrystals incorporated into microspheres (Nature Biotech. 19, 631–635, (2001)). Given the narrow band width demonstrated by these nanocrystals, this approach significantly expands the spectral barcoding capacity in microspheres.

Even though the "spectrally addressed microsphere" approach does provide an advantage in terms of its simplicity over the old fashioned "spatially addressable" approach in microarray making, there was still a need in the art to make the manufacture of biological microarrays less difficult and less expensive.

U.S. Ser. No. 09/942,241 provides a microarray that is less costly and easier to prepare than those previously disclosed because the support need not be modified; nevertheless the microspheres remain immobilized on the substrate. U.S. Ser. No. 09/942,241 provides a microarray comprising: a substrate coated with a composition comprising microspheres dispersed in a fluid containing a gelling agent or a precursor to a gelling agent, wherein the microspheres are immobilized at random positions on the substrate. The substrate is free of receptors designed to physically or chemically interact with the microspheres. That invention utilizes a unique coating composition and technology to prepare a microarray on a substrate that need not be pre-etched with microwells or premarked in any way with sites to attract the microspheres, as disclosed in the art.

U.S. Ser. No. 09/942,241 teaches various coating methods but exemplifies machine coating, whereby a support is coated with a fluid coating composition comprising microspheres dispersed in gelatin. Immediately after coating, the support is passed through a chill set chamber in the coating machine where the gelatin undergoes rapid gelation and the microspheres are immobilized.

While that invention provides a huge manufacturing advantage over then existing technologies, it needs some refinement in order to maximize its full potential value to the art. The problem is that during such machine coating and rapid gelation, the gelling agent tends to cover the surface of the microspheres, thereby preventing the analyte (such as DNA) from penetrating through the gel overcoat and hybridizing with probes on the surface of the microspheres.

SUMMARY OF THE INVENTION

The present invention overcomes the problem outlined above by enzymatically removing the gelling agent from the surface of the microspheres without damaging their integrity or the DNA probes on their surfaces. The enzyme treated surface maintains its physical integrity through the entire DNA hybridization process and the microarray shows a very strong hybridization signal.

The advantage is that enzyme digestion can be easily controlled to remove the required amount from the gel overcoat. Further, the enzyme, a protease, is readily available and economical to obtain.

The present invention provides a method of making a microarray comprising the steps of:
  providing a support;
  coating on the support a fluid composition containing microspheres and gelatin;
  immobilizing the microspheres in the gelatin coating;
  partially digesting the gelatin with an enzyme; and
  removing the enzyme and digested gelatin from the coating.

In another embodiment of the invention there is disclosed a method of making a microarray comprising the steps of:
  providing a support;
  coating on the support a fluid composition containing microspheres and gelatin; and immobilizing the microspheres on the support by allowing gelation of the gelatin at ambient temperatures; wherein the support has no predetermined sites to attract the microspheres.

A random microarray is also disclosed.

DETAILED DESCRIPTION OF THE INVENTION

Figure 1:
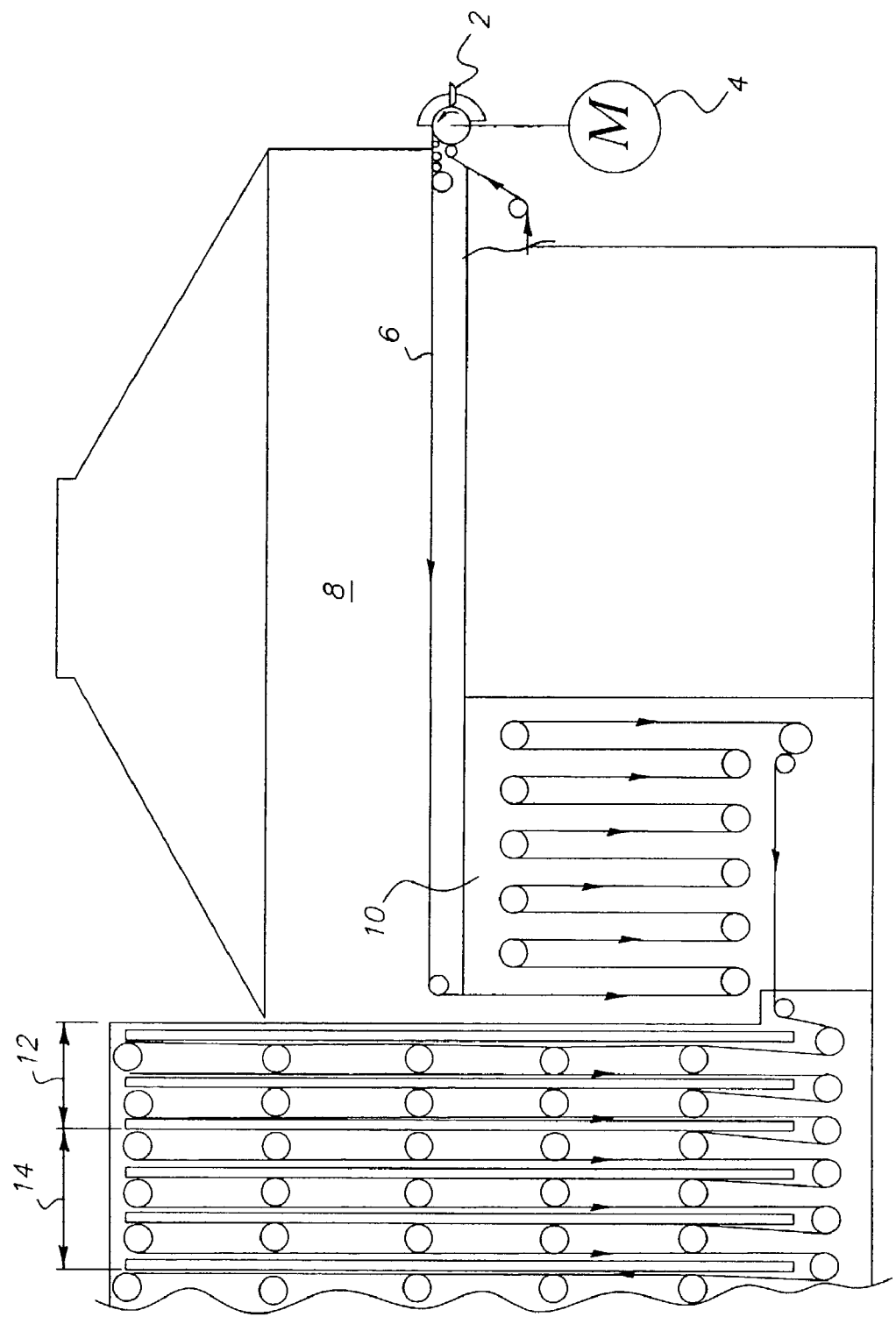
FIG. 1 is a diagram of a coating device.
Figure 2A:
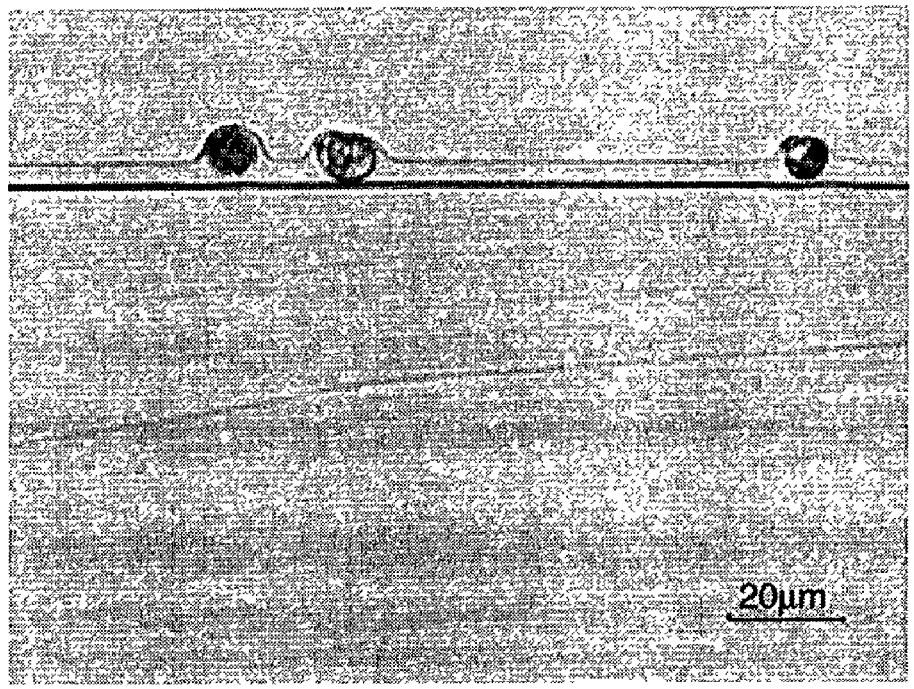
FIGS. 2A, 2B, 2C and 2D show cross sections of a microarray treated with gelatinase for different periods: 0 minutes-2A; 3 minutes-2B; 5 minutes-2C; and 7 minutes-2D.
Figure 2B:
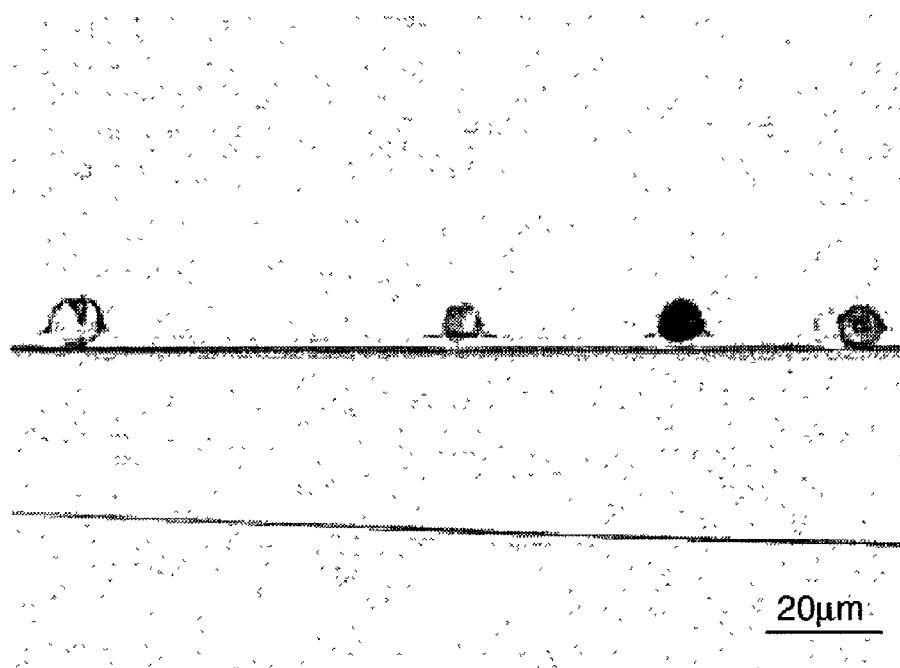
Figure 2C:
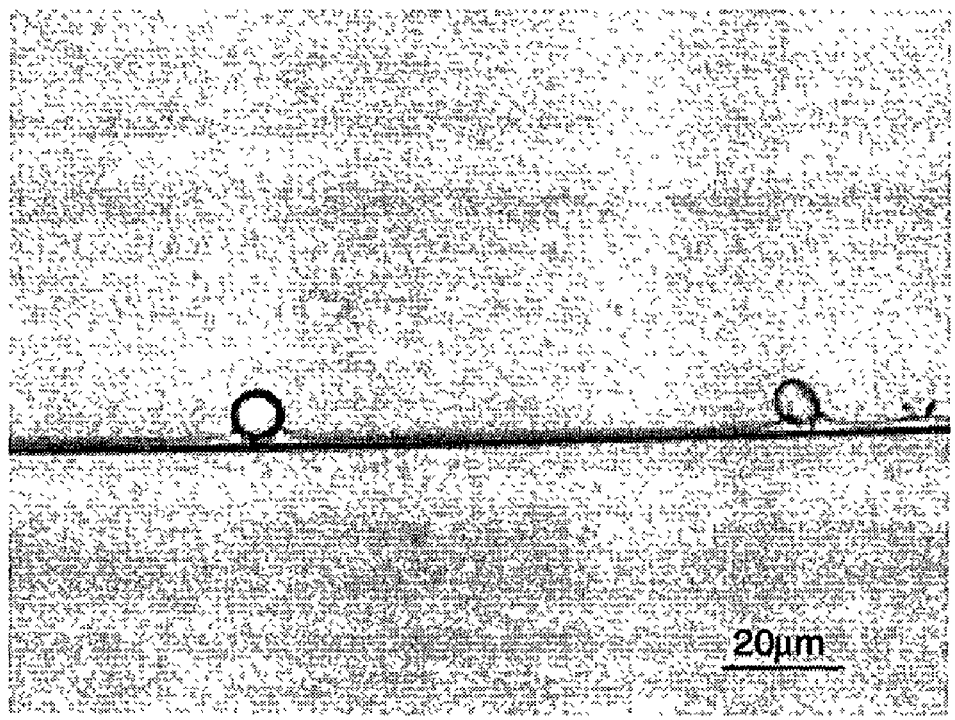
Figure 2D:
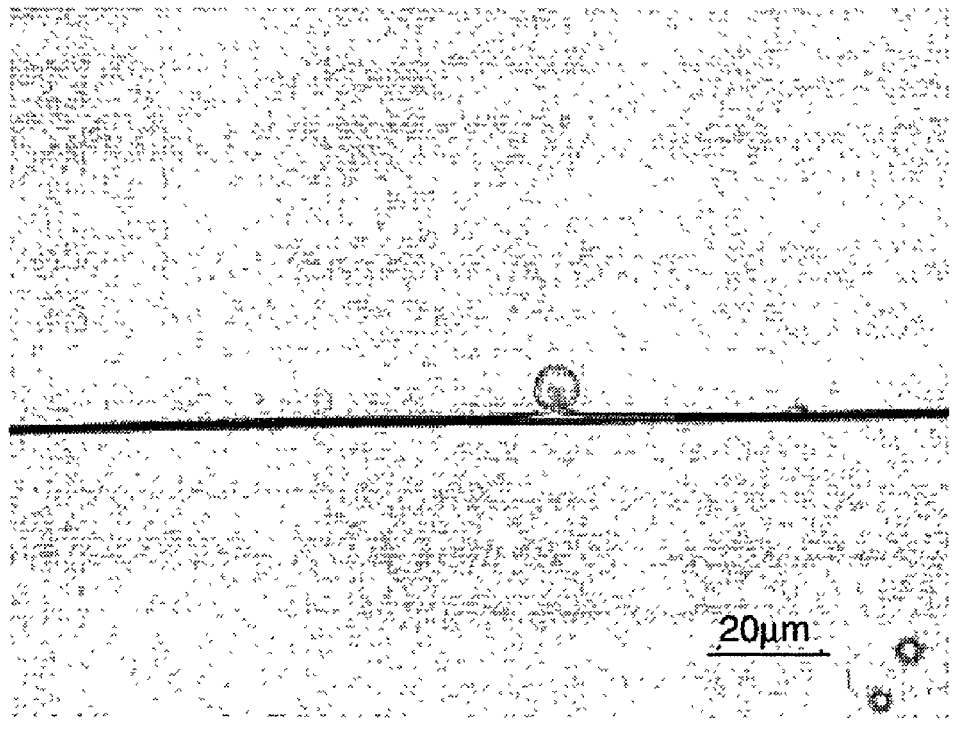

As used herein, the term "enzyme" means a biological catalyst. Similar to traditional chemical catalysts, enzymes speed the rate of biological reactions by producing a transition state with a lower energy of activation than the uncatalyzed reaction. In other words, enzymes are proteins specialized for the reactions they catalyze. The preferred enzymes employed in this invention are enzymes that catalytically hydrolyze the bonds of gelatin and may be referred to as "gelatinases". The particular enzyme used will depend on the choice of gelling agent.

The present invention discloses a method for making an array of microspheres, also referred to as "beads", on a substrate wherein the surface of the microspheres bear capture agents, or probes, which are readily accessible to analytes with which they come in contact. The distribution or pattern of the microspheres on the substrate is entirely random and the microspheres are not attracted or held to sites that are pre-marked or predetermined on the substrate as in other methods previously disclosed. In the present invention, the microspheres are immobilized randomly when the gelling agent in which they are carried undergoes a sol-to-gel transition (also called "gelation").

As used herein, the term "sol-to-gel transition" or "gelation" means a process by which fluid solutions or suspensions of particles form continuous three-dimensional networks that exhibit no steady state flow. This can occur in polymers by polymerization in the presence of polyfunctional monomers, by covalent cross-linking of a dissolved polymer that possesses reactive side chains and by secondary bonding, for example, hydrogen bonding, between polymer molecules in solution. Polymers such as gelatin exhibit thermal gelation that is of the latter type. The process of gelation or setting is characterized by a discontinuous rise in viscosity. (See, P. I. Rose, "The Theory of the Photographic Process", 4$^{th}$ Edition, T. H. James ed. pages 51 to 67).

As used herein, the term "gelling agent" means a substance that can undergo gelation as described above. Examples include materials such as gelatin, water-soluble cellulose ethers or poly(n-isopropylacrylamide) that undergo thermal gelation or substances such as poly(vinyl alcohol) that may be chemically cross-linked by a borate compound. A preferred gelling agent is alkali pretreated gelatin. Other gelling agents may be polymers that may be cross-linked by radiation such as ultraviolet radiation. Further examples of gelling agents include acacia, alginic acid, bentonite, carbomer, carboxymethylcellulose sodium, cetostearyl alcohol, colloidal silicon dioxide, ethylcellulose, gelatin, guar gum, hydroxyethylcellulose, hydroxypropyl cellulose, hydroxypropyl methylcellulose, magnesium aluminum silicate, maltodextrin, methylcellulose, polyvinyl alcohol, povidone, propylene glycol alginate, sodium alginate, sodium starch glycolate, starch, tragacanth and xanthum gum. (For further discussion on gelling agents, see Secundum Artem, Vol. 4, No. 5, Lloyd V. Allen). Alpha or beta amylase or cellulase may be used to remove excess polysaccharides and agarase may be used to remove excess agar.

The invention discloses a polymeric latex bead based random microarray with each bead in the array having a distinct signature that would distinguish the bead. Such a signature may be based on color, shape or size of the bead. For signatures based on color, the color may be derived from mixing three dyes representing the primary colors R, G, B to create thousands of distinguishable beads with distinct "color addresses" (unique RGB values, e.g. R=0, G=204, B=153). The beads can be made with sites on their surfaces that are "active", meaning that at such sites physical or chemical interaction can occur readily between the bead and other molecules or compounds. Such compounds may be organic or inorganic. Usually, the molecule or compound is organic-nucleic acid and fragments thereof, are examples. As in the examples below, to the surface of each color coded bead may be attached a pre-synthesized oligonucleotide, or other biological agents. Therefore, each color address can correspond to a specific bioactive probe. These beads may be mixed in equal amounts, and the random microarray fabricated by coating the mixed beads in a single or multilayer format.

Coating methods are broadly described by Edward Cohen and Edgar B. Gutoff in Chapter 1 of "Modern Coating And Drying Technology", (Interfacial Engineering Series; v.1), (1992), VCH Publishers Inc., New York, N.Y. For a single layer format, suitable coating methods may include dip coating, rod coating, knife coating, blade coating, air knife coating, gravure coating, forward and reverse roll coating, and slot and extrusion coating.

Drying methods also vary, sometimes with surprisingly varying results. For example, when the fluid gelatin/microsphere composition is rapidly dried by chill setting, gelation occurs before the gelatin has had time to flow from the raised surfaces of the microspheres, causing a layer of gelatin to be formed that blocks direct contact between the microsphere surface and any agent to be deposited thereon. When the fluid composition is allowed to dry more slowly at ambient temperatures, the gelatin flows from the microsphere surface, leaving the microsphere substantially free of gelatin. By "substantially free" it is meant that the surface of the microsphere is sufficiently free of gelatin to interact with a probe or agent to attached thereto.

Fluorescently/chemiluminescently labeled biological sample can be hybridized to the bead based random microarray. The signals from both "color addressable" polymeric beads and biological sample non-selectively labeled with fluorescence/chemiluminescence may be analyzed by a charge coupled device after image enlargement through an optical system. The recorded array image can be automatically analyzed by an image processing algorithm to obtain bioactive probe information based on the RGB color code of each bead, and the information compared to the fluorescence/chemiluminescence image to detect and quantify specific biological analyte materials in the sample. Optical or other electro-magnetic means may be applied to ascertain signature.

Although microspheres or particles having a substantially curvilinear shape are preferred because of ease of preparation, particles of other shape such as ellipsoidal or cubic particles may also be employed. Suitable methods for preparing the particles are emulsion polymerization as described in "Emulsion Polymerization" by I. Piirma, Academic Press, New York (1982) or by limited coalescence as described by T. H. Whitesides and D. S. Ross in J. Colloid Interface Science, vol. 169, pages 48–59, (1985). The particular polymer employed to make the particles or microspheres is a water immiscible synthetic polymer that may be colored. The preferred polymer is any amorphous water immiscible polymer. Examples of polymer types that are useful are polystyrene, poly(methyl methacrylate) or poly (butyl acrylate). Copolymers such as a copolymer of styrene and butyl acrylate may also be used. Polystyrene polymers are conveniently used. The formed microsphere is colored using an insoluble colorant that is a pigment or dye that is not dissolved during coating or subsequent treatment. Suitable dyes may be oil-soluble in nature. It is preferred that the dyes are non-fluorescent when incorporated in the microspheres.

The microspheres are desirably formed to have a mean diameter in the range of 1 to 50 microns; more preferably in the range of 3 to 30 microns and most preferably in the range of 5 to 20 microns. It is preferred that the concentration of microspheres in the coating is in the range of 100 to a million per $cm^2$, more preferably 1000 to 200,000 per $cm^2$ and most preferably 10,000 to 100,000 per $cm^2$.

The attachment of bioactive agents (often referred to as "probes") to the surface of chemically functionalized microspheres can be performed according to the published procedures in the art (Bangs Laboratories, Inc, Technote #205). Some commonly used chemical functional groups include, but not limited to, carboxyl, amino, hydroxyl, hydrazide, amide, chloromethyl, epoxy, aldehyde, etc. Examples of bioactive agents or probes include, but are not limited to, oligonucleotides, DNA and DNA fragments, PNAs, and synthetic molecules capable of interacting specifically with a target such as a nucleic acid sequence.

The enzymes used in this invention include any enzyme, enzyme preparation, or enzyme-containing formulation capable of dissolving or degrading gelatin or other gelling agent used and substantially incapable of digesting or inactivating the probe. By inactivating it is meant that the probe is inhibited from reacting with a specific target under normal conditions of reaction. Thus, "enzyme" in the context of this invention includes crude enzyme preparations, such as crude plant or bacterial fermentation broth extracts, as well as purified enzymes from plant, animal, or bacterial sources. Preparations of enzyme usable in the process are understood to include activators, cofactors, and stabilizers that are required for enzymatic activity, as well as stabilizers that enhance or preserve enzyme activity.

Examples of suitable enzymes include serine proteases such as Esperase™, Alcalase™, and Savinase™ (commercial enzyme preparations from Novo Nordisk Corporation); Multifect P-3000™, HT Proteolytic 200™, Protex 6L™ and Protease 899™ (commercial enzyme preparations from Genencor International Corporation); sulfhydryl proteases such as papain and bromelain; and metaloproteases such as Neutrase™ (a commercial bacterial metaloenzyme preparation from Novo Nordisk Corporation). The use of combinations of these enzymes and enzyme types are also envisaged under this invention. Adducts of enzymes with synthetic polymers are also envisaged in which enzyme molecules are attached to synthetic polymers, which polymers may be larger or smaller than the enzyme.

Other enzymes, preferably proteolytic, should also be suitable for this application. The use of combinations of these enzymes and enzyme types are also envisaged under this invention. Adducts of enzymes with synthetic polymers are also envisaged in which enzyme molecules are attached to synthetic polymers, which polymers may be larger or smaller than the enzyme.

EXAMPLES

Example 1

This example illustrates the preparation of colored microspheres by incorporating dyes into the microspheres and the process of preparing the coating containing colored microspheres.

Twenty-four grams of a 4% aqueous suspension of polystyrene beads prepared by emulsion polymerization and having a mean size of 9.5 micrometers was combined with 0.48 grams of poly(vinyl alcohol)(75% hydrolyzed, molecular weight 2000).

A suspension of magenta colored beads was prepared by first dissolving 0.084 grams of Dye 1 in 0.08 grams of toluene and 7.92 grams of acetone. From the above suspension of polystyrene beads containing poly(vinyl alcohol) an amount of 8.16 grams was then added slowly (drop-wise) to this solution of the dyes while stirring to prepare a suspension of colored beads. The suspension of colored beads was then filtered using a porous cotton filter, poured into a dialysis bag (12,000 to 14,000 molecular weight cut off) and washed with distilled water for one hour. After washing, the suspension of colored beads was filtered again using a porous cotton filter. The concentration of magenta colored beads in the suspension after this final step was 1.2%.

Suspensions of cyan and orange colored beads were prepared in a similar manner using Dye 2 and Dye 3 (Sudan Orange 220 from BASF corporation) respectively in place of Dye 1. The concentration of colored beads in these suspensions were 1.6% and 1.45% respectively.

Formulations for coating were prepared in the following manner.

Formulation 1 (invention)

This was prepared by combining 4.0 grams of the suspension of cyan colored beads, 5.33 grams of the magenta colored beads and 4.41 grams of the orange colored beads with 13.91 grams of a 11.5% solution of lime processed ossein gelatin in water, 3.2 grams of coating aid (6.8% solution of Triton X 200E in water) and 49.15 grams of distilled water.

Formulation 2 (control)

A second formulation for coating was prepared by combining the same amounts cyan, magenta and orange colored beads with 7.27 grams of poly(vinyl alcohol) (GH23 from Nippon Gohsei) and 55.79 grams of water. The amount of coating aid was the same as in formulation 1. The amount of poly(vinyl alcohol) was chosen to match the viscosity of formulation 1 at the higher temperatures (See, below).

Both samples (formulation 1 and formulation 2) were equilibrated in a 50° C. water bath for 30 minutes and then analyzed using a Rheometric Fluid Rheometer. Viscosities were determined as a function of temperature by the dynamic oscillatory technique as the samples were cooled at the rate of one degree centigrade per minute.

TABLE #1

| Temperature (° C.) | Viscosity (centipoise) | |
|---|---|---|
| | Formulation 1 | Formulation 2 |
| 45 | 2.0 | 2.0 |
| 40 | 2.2 | 2.2 |
| 35 | 2.8 | 2.9 |
| 30 | 3.4 | 3.5 |
| 25 | 5.1 | 4.3 |
| 20 | 2107 | 4.6 |
| 15 | 100,000 | 6.0 |
| 10 | 440,000 | 7.9 |

It may be seen from the above data that at the higher temperatures (above about 30° C.), both samples behave similarly in terms of the increase in viscosity upon cooling. However, below about 25° C. formulation 1 (invention) displays a much more dramatic increase in viscosity because of gelation. Such behavior is not exhibited by formulation 2 (control). The viscosity of formulation 1 increases by several orders of magnitude as the temperature is reduced from 25° C. to 10° C. The temperature of onset of gelation is estimated to be 21.8° C.

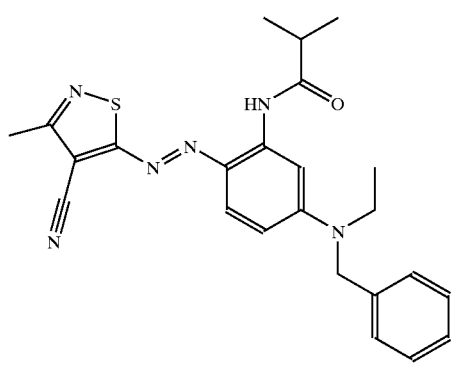

Dye 1

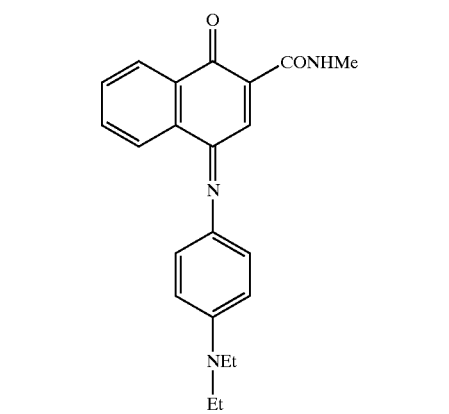

Dye 2

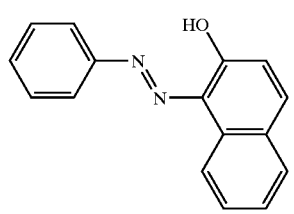

Dye 3

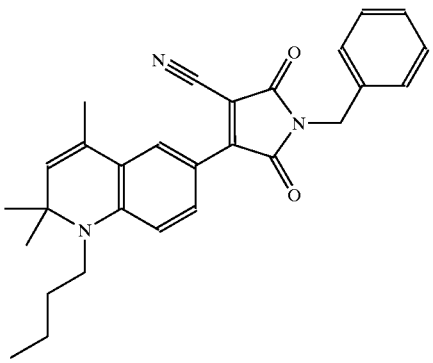

Dye 4

A suspension of Cyan colored beads was prepared by first dissolving 0.001 grams of dye 2 in 0.05 grams toluene and 4.95 grams acetone. 2.5 grams of a 4% aqueous suspension of polystyrene beads prepared by emulsion polymerization and having a mean size of 9.5 micrometers was then added slowly (drop-wise) to this solution of the dyes while stirring to prepare a suspension of 1% dye loaded cyan dye. The suspension of colored beads was then filtered using a porous cotton filter, poured into a dialysis bag (12,000 to 14,000 molecular weight cut off) and washed with distilled water for one hour. The concentration of cyan beads in the suspension after this final step was 0.78%.

Suspensions of the other 5 levels of cyan dye incorporated into the beads were prepared in a similar manner using 0.002 grams dye 2, 0.006 grams dye 2, 0.007 grams dye 2, 0.009 grams dye 2, and 0.01 grams dye 2.

For preparing the last two samples, 2.5 grams of a 4% aqueous suspension of polystyrene beads prepared by emulsion polymerization and having a mean size of 9.5 micrometers was combined with 0.48 grams of poly(vinyl alcohol) (75% hydrolyzed, molecular weight 2000). This was used in place of the polystyrene beads alone.

A 4% aqueous suspension of 2.5 grams polystyrene beads prepared by emulsion polymerization and having a mean size of 9.5 micrometers was combined with 0.48 grams of poly(vinyl alcohol)(75% hydrolyzed, molecular weight 2000).

A suspension of Magenta colored beads was prepared by first dissolving 0.01 grams of dye 1 in 0.05 grams of toluene and 4.95 grams acetone. From the above suspension of polystyrene beads containing poly(vinyl alcohol) an amount of 5.00 grams was then added slowly (drop-wise) to this solution of the dyes while stirring to prepare a suspension of 5% dye loaded Magenta dye. The suspension of colored beads was then filtered using a porous cotton filter, poured into a dialysis bag (12,000 to 14,000 molecular weight cut off) and washed with distilled water for one hour. The concentration of cyan beads in the suspension after this final step was 2.59%.

Suspensions of the other 4 colors of dye incorporated into the beads were prepared in a similar manner using 0.05 grams of each of the following dyes: dye 2(114FN-D89), dye 3 (BASF Sudan Orange 220), dye 4 (MM2500FAN), and dye 5 (BASF Yellow 075). Plain polystyrene beads were also used at 4% for the color white.

Formulation 1 and formulation 2 from Example 1 were coated on a 0.18 mm thick substrate of polyethyleneterephthalate (PET) containing 6% by weight titanium dioxide using the coating device shown in FIG. 1. The formulations were introduced through a slot coating die 2, driven by a motor M4, at a temperature of 45° C., on to a 12.7 cm wide web 6 moving at the rate of 3.7 n/min. The flow rate was adjusted to provide a level of 0.043 g/m$^2$ for each of the cyan, magenta and orange colored beads. The coatings were chill-set in a 2.4 m long chilling section 8 that was maintained at a temperature of 4° C. and 56.6% RH and then passed through a conditioning chamber 10 before being dried in a first 12 and then a second 14 drying section that were 9.8 m and 11.6 m in length respectively. The first drying section 12 was maintained at a temperature of 21° C. and 33.2% RH and the second 14 was maintained at a temperature of 37.8° C. and 18.6% RH.

Example 2

This example illustrates the attachment of pre-synthesized single strand oligonucleotide probe to the surface of dye incorporated beads.

Three DNA oligonucleotide probe sequences and their complementary target sequences were used in this example. The probe sequence was modified with primary amine at their 5 prime end and the target sequence was modified with biotin at their 5 prime end.

One hundred microliters of Dye incorporated beads (4% w/v) was rinsed three times in acetate buffer (0.01 M, pH5.0), and combined with one hundred microliters of 20 mM 2-(4-Dimethylcarbomoyl-pyridino)-ethane-1-sulfonate and ten percent of polyethyleneimine. The mixture was agitated at room temperature for one hour and rinsed three times with sodium boric buffer (0.05 M, pH8.3). The beads were re-suspended in sodium boric buffer.

An oligonucleotide DNA probe with 5'-amino-C6 modification was dissolved in one hundred microliters of sodium boric buffer to a final concentration of 40 nmol. A 20 microliters of cyanuric chloride in acetonitrile was added to the DNA probe solution and the total volume was brought up to 250 microliter using sodium boric buffer. The solution was agitated at room temperature for one hour and then dialyzed against one liter of boric buffer at room temperature for three hours.

A 100 microliters of the dialyzed DNA solution was mixed with 200 microliters of beads suspension. The mixture was agitated at room temperature for one hour and rinsed three times with sodium phosphate buffer (0.01 M, pH7.0). The modified beads were coated onto transparent plastic support according to formulation 1 as described in Example 1.

Example 3

This example illustrates the hybridization and detection of target nucleic acid sequences to the gelatin coated microsphere based microarray.

An oligonucleotide DNA with 5'-biotin labeling, which has complementary sequence to the DNA probe, was dissolved in a hybridization solution containing 0.9 M NaCl, 0.06 M NaH$_2$PO$_4$, 0.006 M EDTA, and 0.1% SDS, pH 7.6 (6XSSPE-SDS) to a final concentration of 1 µM. The bead coated microarray was hybridized in the hybridization solution starting at 68° C. and slowly cooled down to room temperature. Following hybridization, the microarray was washed in 0.5XSSPE-SDS for 15 minutes three times. The microarray was incubated in a solution containing streptavidin-horseradish peroxidase conjugate in a 0.01 M phosphate buffer 0.1 M NaCl pH7.0 for 1 hour at room temperature. Following the incubation, the microarray was rinsed three times with the incubation buffer.

The hybridization completed microarray was imaged with white light illumination using Olympus BH-2 microscope (Diagnostic Instruments, Inc. SPOT camera, CCD resolution of 1315×1033 pixels) to obtain the color beads barcode signature information, followed by a dark field chemiluminescence image capture by placing a thin layer of Super-Signal® ELISA chemiluminescence substrate solution (purchased from PIERCE ENDOGEN) over the microarray.

Example 4

This example illustrates the influence of the enzyme digestion on DNA hybridization onto coatings containing colored microspheres or beads.

Gelatinase was purchased from Genencor International Inc. and was used without further purification. Galatinase of 0.5 g was dissolved in 60 mL of water. Coating containing colored microspheres was immersed in the enzyme solution for various length of time at 37° C. and the enzymolysis reaction was stopped by dipping the enzyme treated coating into a running water bath for 5 minutes. The coatings treated with gelatinase for 3, 5, and 7 minutes were cross sectioned and the cross sections were imaged under microscope to visualize the extent of gelatin removal. The images were shown in FIGS. 2A, 2B, 2C, and 2D. The biotin labeled target DNA fragment complimentary to the probe DNA sequence on the surface of the beads were hybridized to the coating treated with gelatinase for various lengths of time. The chemiluminescence signal was detected as described in Example 3 and the results were summarized in Table 2.

TABLE 2

| Time of Gelatinase treatment | 0 minutes* | 3 minutes | 5 minutes | 7 minutes |
|---|---|---|---|---|
| Chemiluminescence detection | No | Yes | Yes | Yes |

Figure 3A:
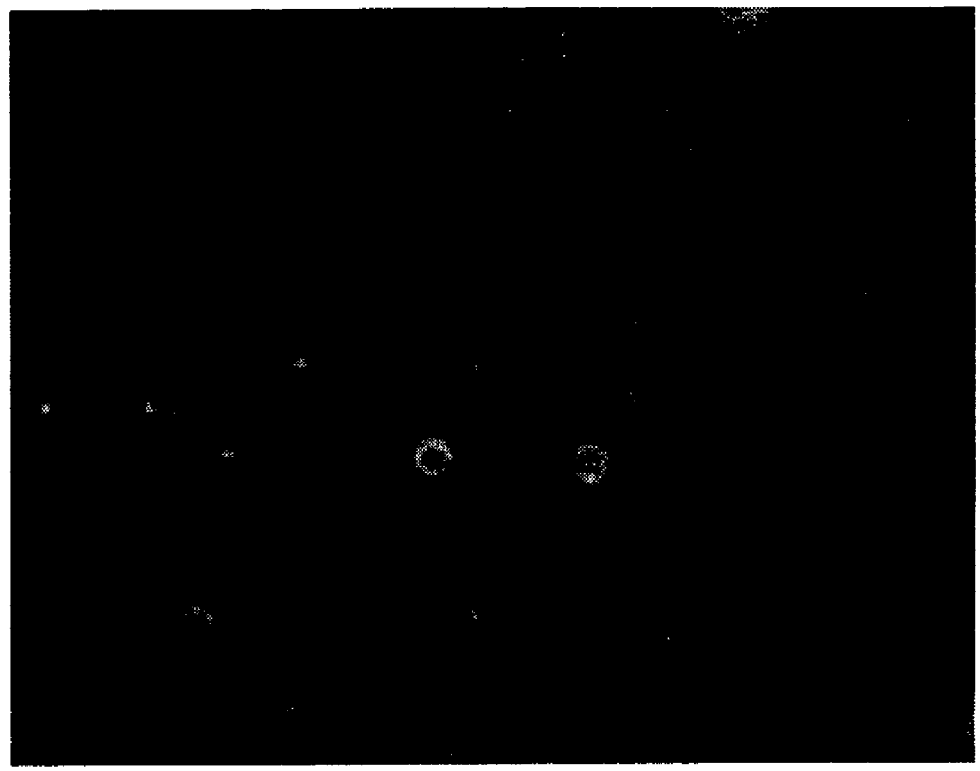
FIGS. 3A, 3B, and 3C show coated DNA microarrays captured under a dark field without illumination after exposure to a solution containing all three target nucleic acid sequences.
Figure 3B:
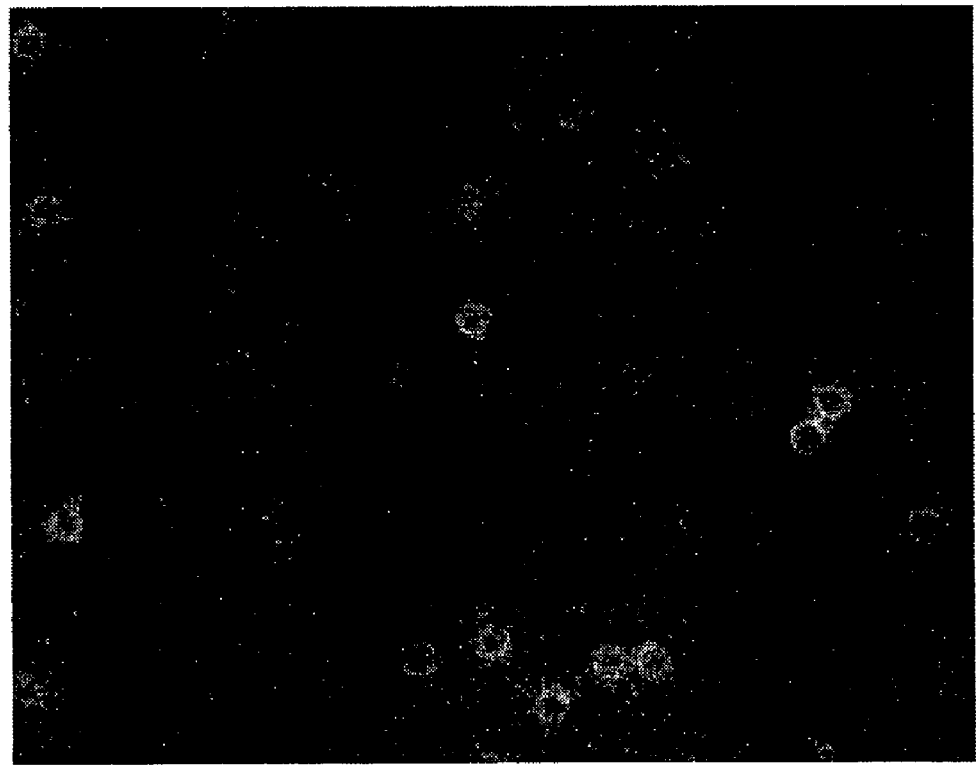
Figure 3C:
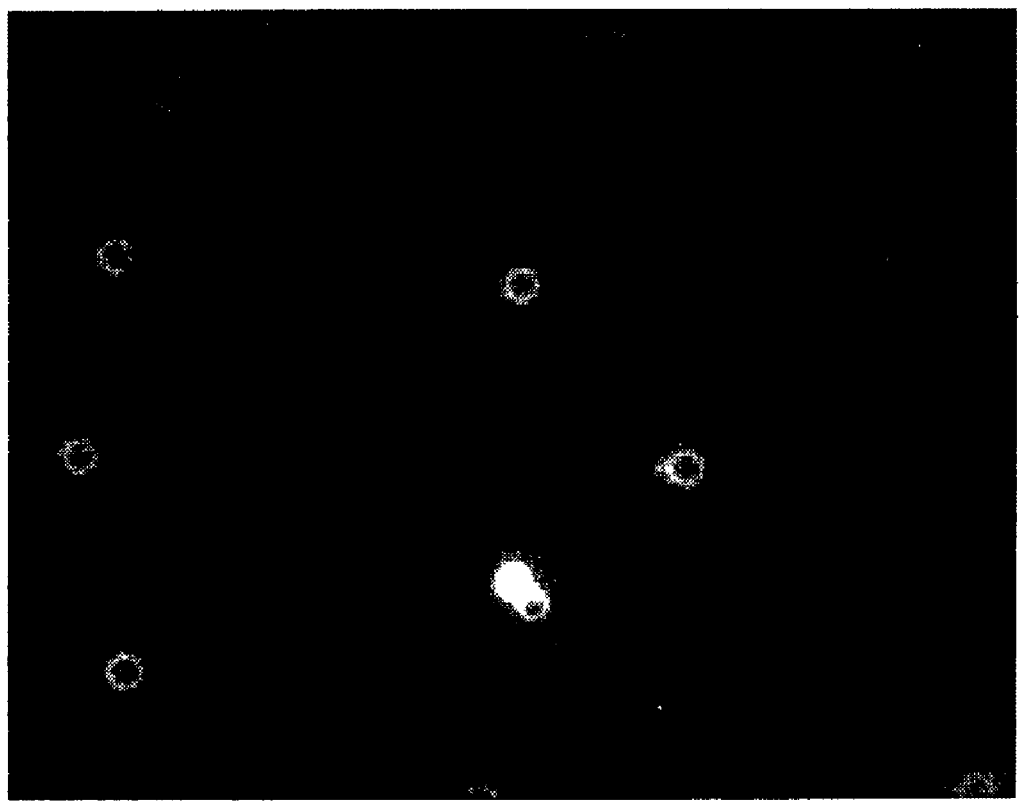

The chemiluminescence images for 3, 5 and 7 minutes enzyme treatment are shown in FIGS. 3A, 3B, and 3C.

This example illustrates only one condition for the enzymolysis reaction. However, the condition for the enzymolysis reaction can also be performed by dissolving the enzyme in buffered solutions or organic solvents and carried out at appropriate temperature. One skilled in the arts can modify the process to accommodate certain desirable applications.

Any method of enzymolysis is within the scope of the present invention provided the gelling agent is substantially removed from the surface of the microsphere which means that the probe attached to the surface is sufficiently free of gelatin to interact with the intended target.

The invention has been described in detail with particular reference to preferred embodiments thereof, but it will be understood that variations and modifications can be effected within the spirit and scope of the invention.

What is claimed is:

1. A method of making a microarray comprising the steps of:
   providing a support;
   coating on at least one surface of the support a fluid composition containing microspheres and gelatin;
   immobilizing the microspheres in the gelatin coating;
   partially digesting the gelatin with an enzyme to expose surfaces of the microspheres; and removing the enzyme and digested gelatin from the coating, such that a first portion of the microspheres is submerged in the gelatin coating on the support and a second portion is exposed above the gelatin coating and is substantially free of gelatin.

2. The method according to claim 1 wherein the composition is coated on the support using machine coating.

3. The method according to claim 1 wherein the immobilization of the microspheres is preserved upon gelation of the gelatin.

4. A method according to claim 3 wherein the coating composition undergoes rapid gelation by chill setting immediately after coating.

5. A method according to claim 1 wherein the enzyme is esperase, alcalase, savinase, or papain.

6. A method according to claim 1 wherein enzyme digestion is terminated by immersing the support with the gelatin coating into a solution that contains no enzyme.

7. A method according to claim 6 wherein the solution that contains no enzyme is an aqueous solution.

8. A method according to claim 1 wherein the exposed surfaces of the microspheres bear nucleic acid probes.

9. A method according to claim 8 wherein the nucleic acid probes on the surfaces of the microspheres are oligonucleotides, DNA, DNA fragments, PNAs, or synthetic molecules capable of interacting specifically with a nucleic acid sequence.

10. A microarray comprising: a support having at least one surface containing microspheres immobilized in a gelatin coating; wherein a first portion of the microspheres is submerged in the gelatin coating and a second portion is exposed above the gelatin coating and is substantially free of gelatin.

11. A microarray according to claim 10 wherein the immobilization of the microspheres on the gelatin coating is preserved upon gelation of the gelling agent.

12. A microarray according to claim 10 wherein the microspheres bear chemically active sites.

13. A microarray according to claim 12 wherein the chemically active sites comprise nucleic acid.

14. A microarray according to claim 10 wherein the support comprises glass, plastic, cellulose acetate, or polyethyleneterephthalate.

15. A microarray according to claim 10 wherein the support is flexible.

16. A method of making a microarray comprising the steps of:
providing a support;
coating on at least one surface of the support a fluid composition containing microspheres and gelatin; and
immobilizing the microspheres on the support by allowing gelation of the gelatin such that a first portion of the microspheres is submerged in the gelatin and a second portion is exposed above the gelatin and is substantially free of gelatin; wherein the support has no predetermined sites to attract the microspheres.

17. A method according to claim 16 wherein the composition is coated on the support using knife coating, blade coating or slot coating.

18. A method according to claim 1 or 16 wherein the composition is fluid during coating and the microspheres become randomly immobilized on the support in the plane of coating upon gelation of the gelatin.

* * * * *